Aug. 10, 1937.  C. M. EASON  2,089,786
CLUTCH
Filed June 21, 1934     3 Sheets-Sheet 2

Patented Aug. 10, 1937

2,089,786

UNITED STATES PATENT OFFICE 2,089,786

CLUTCH

Clarence M. Eason, Waukesha, Wis., assignor to Industrial Clutch Company, Waukesha, Wis., a corporation of Wisconsin Application June 21, 1934, Serial No. 731,614

19 Claims. (Cl. 192—66)

This invention relates to clutches, and is more particularly directed to clutches of the cone type used in connection with engines and the like, for clutching a power take-off shaft, or driven shaft, to the drive shaft of the engine.

In providing such a structure, wherein two independently mounted shafts, each carried rigidly in its own bearings, are brought together in coaxial aligned position, it has been found that, because of practical limitations, it is ordinarily not possible to align the two shafts perfectly, and consequently some misalignment usually occurs. This misalignment produces stresses which are impressed either on the shafts or on the clutch, resulting in localized wear and rapid eventual destruction of these members.

The present invention overcomes these disadvantages by providing a clutch construction which will permit slight coaxial misalignment of the driving and driven shafts without the destructive effects heretofore noticed.

In a preferred embodiment of the invention, this is accomplished by entirely separating the driven member of the clutch and the driven shaft, the driving connection between the two being through the medium of plastic or yielding bushings of rubber, or similar composition. These bushings absorb within themselves, by intermolecular stressing, the unavoidable oscillatory movement between the driven clutch member, which is concentric with the drive shaft, and the driven shaft, due to slight misalignment of the axes of these shafts.

The driven clutch member, the abutment plate, and the thrust applying means of the present clutch structure, when in engaged position, constitute an integral part of the flywheel, concentric therewith, and in which there can be no possible relative metal-to-metal movement. This unit is then coupled to the spider, or torque transmitting member keyed to the driven shaft, through the resilient yielding bushing members for absorbing relative movement therebetween due to possible coaxial misalignment of the shafts.

The present invention contemplates the application of this separation of the driven clutch member from the driven shaft, in clutches of both the spring-loaded type and those of the toggle operated type, as well as other types of clutch structures in which it may be employed.

Another feature of the present invention is the provision, in larger sizes of clutches of the heavy duty type which are partially enclosed, of means for effecting cooling of the clutch cone surfaces and clutch torque-transmitting structure, this cooling means also serving to withdraw the small particles of material constantly being broken away between the clutch surfaces. This cooling means is operated by rotation of the clutch itself, and adds no unnecessary restrictions or structure to the simplified clutch construction.

A further feature of the present invention resides in the provision of an abutment plate for a spring-loaded type of cone clutch which is mounted in a bearing in the flywheel, and which is retained against outward movement. Also, the present construction provides for no end thrust being delivered to this bearing except when the clutch is engaged, at which time the inner and outer races of the bearing both revolve together.

Another advantage secured by the present invention is the provision of a clutch structure in which there is never, either in engaged or disengaged position, any end thrust upon the driving or driven members.

Other objects and advantages of the present invention will appear more fully from the following detailed description which, taken in connection with the accompanying drawings, will disclose to those skilled in the art the construction and operation of a preferred form of my invention.

In the drawings:

Figure 4 is a fragmentary vertical sectional view showing the manner in which the abutment plate is associated with the pilot bearing of the clutch shown in Figures 1 and 2.

Figure 1:
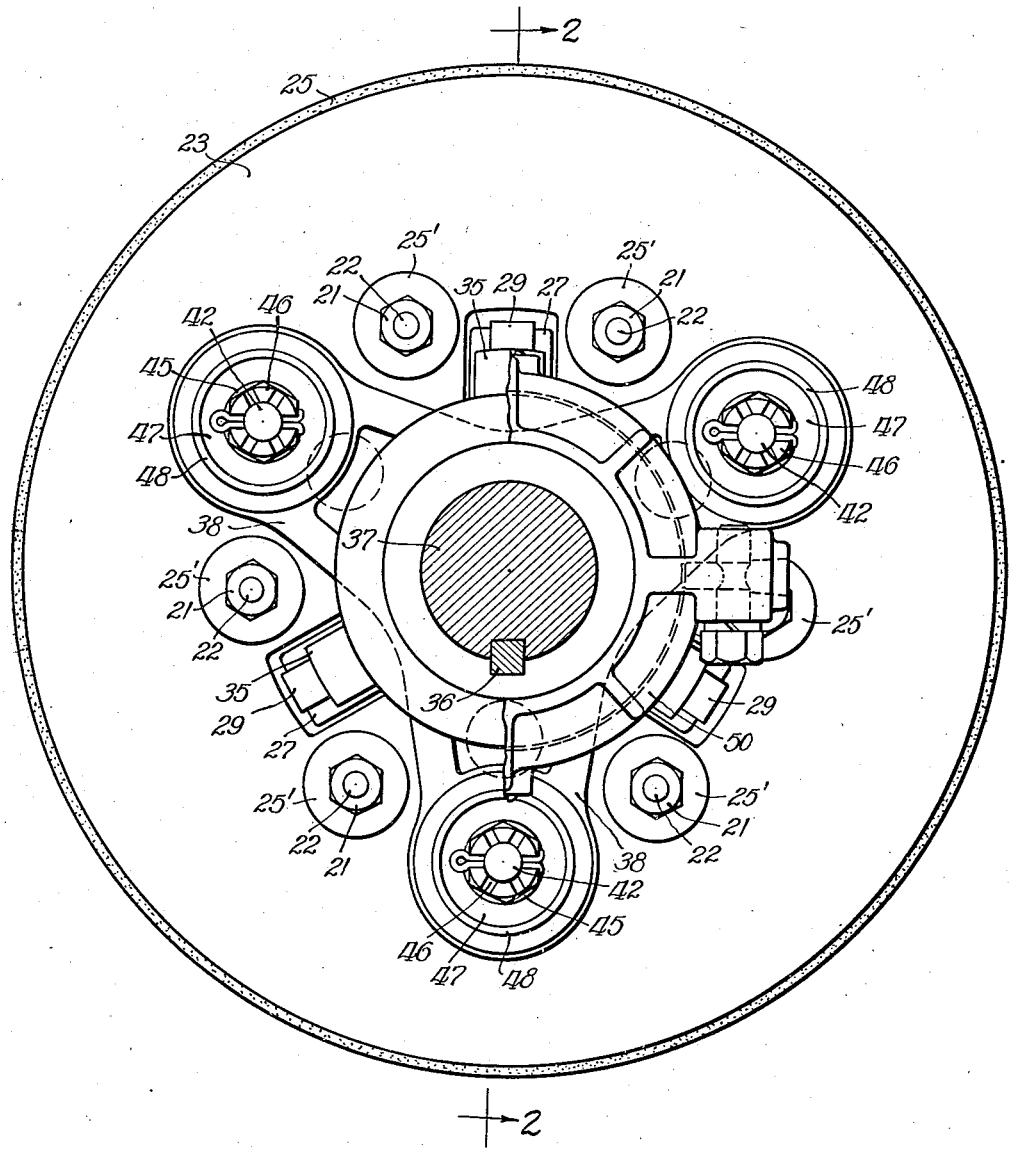
Figure 1 is a front elevational view of the driven parts of a clutch embodying the present invention.
Figure 2:
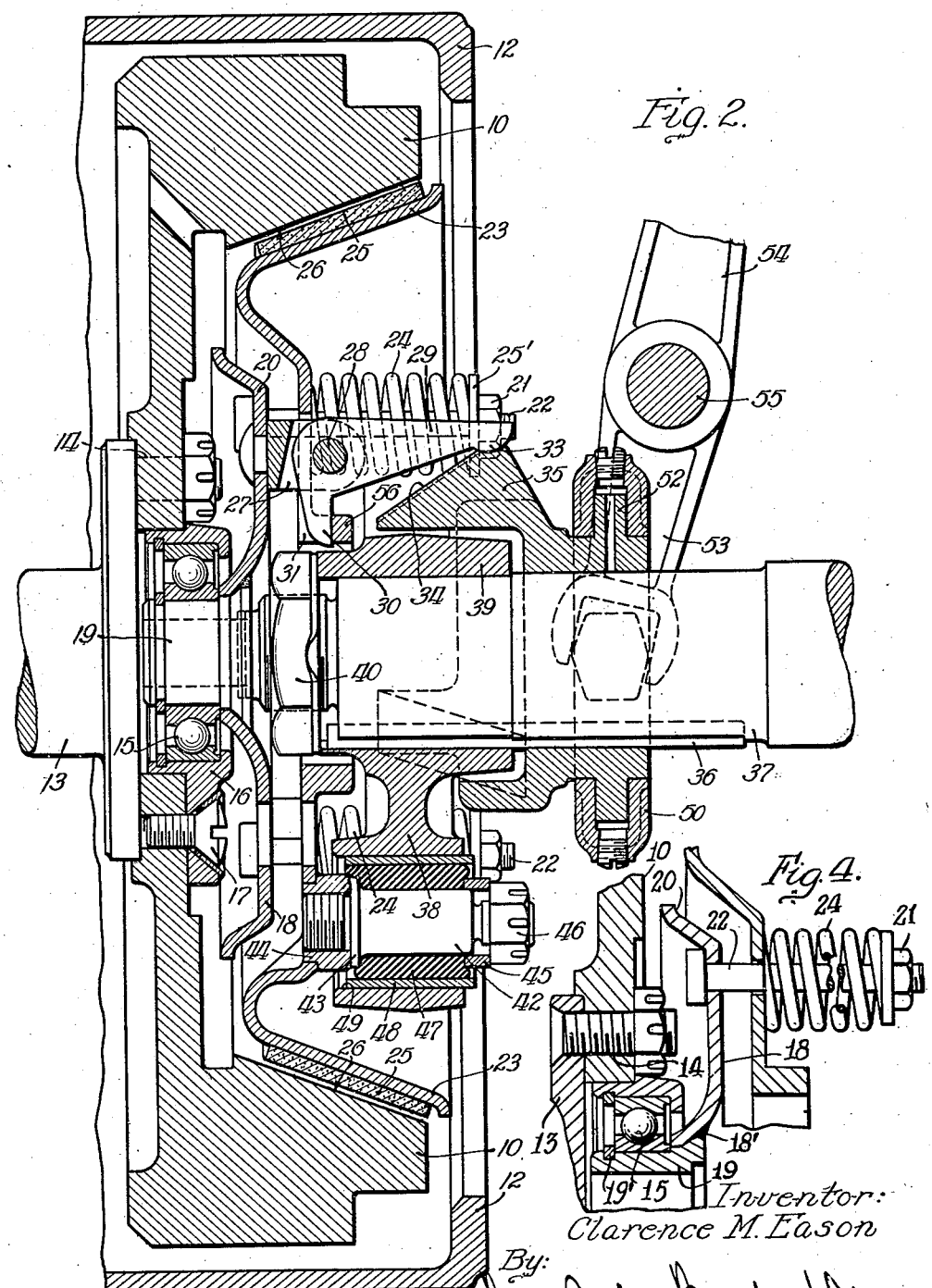
Figure 2 is a vertical sectional view of the clutch, taken on the line 2—2 of Figure 1, showing the clutch in operating position in a flywheel structure.

Referring now more in detail to the drawings, in Figures 1 and 2 I have shown a spring-loaded type of cone clutch embodying the principles of the present invention.

In this embodiment a flywheel is indicated at 10, and is provided with an overhanging enclosing frame 12. The flywheel 10 is bolted to the crankshaft 13 in the usual manner, as by bolts 14. Disposed centrally in the flywheel 10 is a pilot bearing, shown generally at 15, comprising a ball bearing assembly held in position within a retaining ring member 16 secured to the flywheel by means of bolts 17.

A clutch abutment plate 18, having a central hub portion 19 mounted within the inner race of the ball bearing 15, is mounted in position concentrically with the flywheel 10 and is provided with a radially extending annular surface 20 having a plurality of spaced circumferential openings therein receiving bolt members 22, which bolt members extend through openings in the cone clutch driven member 23, and serve as supports for a plurality of loading springs 24, these loading springs being preferably distributed about the periphery of the plate. The hub portion 19 is made up separately of the plate 18 and the hub 19 and plate 18 are integrally joined by welding at 18' as shown in Figure 4. A snap ring 19' retains the hub 19 in the bearing 15.

The cone clutch driven member 23 is provided with a friction surface or lining 25, of usual construction, which engages the inner surface 26 of the flywheel 10, the member 23 being axially reciprocable to be engaged with or disengaged from the surface 26.

As will be apparent, the member 23 is, when in engaged position, disposed concentrically with respect to the shaft 13. In addition, the plate 18 is provided with extending supporting lugs 27, which form pivots 28 for a plurality of bell crank levers 29 mounted thereon, these levers having one arm 30 thereof engaging in suitable cut-out portions 31 of the radially extending portion of the member 23, and the bell crank members 29 being rotatable about the pivots 28 to draw the clutch member outwardly of the flywheel 10 for disengaging the same. The outer end 33 of the bell crank 29 is provided with a camming surface adapted to engage the camming surface 34 of an actuating member 35 keyed, as at 36, to the driven shaft 37.

Keyed upon the inner end of the shaft 37 is a spider member 38 having a hub portion 39 secured against endwise movement with respect to the shaft 37 by means of a lock nut 40. The spider 38 is provided with a plurality of extending arm portions, as shown in detail in Figure 1, which are adapted to receive connecting studs 42 carried by the driven cone plate 23. The studs 42 are provided with shoulders 43 bearing against bosses 44 formed on the plate 23, and, at their outer ends, are provided with collar members 45 secured in position by the locking nuts 46.

Disposed about the shanks of the bolts or studs 42 are flexible yielding bushing members 47, formed of rubber or similar composition, which are compressed tightly between the shoulder 43 and the collar 45, and are adapted to be enclosed by bushing members or sleeves 48, formed of bronze or other bearing material, which have relative sliding engagement in the sockets 49 formed in the extending arms of the spider.

The member 35 is slidable axially of the shaft 37 upon the spline 36, and is actuated by means of the clutch yoke collar 50, mounted upon the annular flange 52 of the hub portion of the member 35, which yoke collar 50 is adapted to be engaged by the arm 53 of a clutch operating lever 54 pivoted at 55 for throwing the clutch into and out of engagement. Thus, when the member 35 is moved outwardly axially along the shaft 37, the cam 33 is adapted to ride down the surface 34, withdrawing the arm 30 from engagement within the cut-out portion 31 at the inner end of the radially flanged portion of the cone clutch driven member 23, and consequently allowing the springs 24, which are biased against the washers 25' held in position at the outer ends of the bolt members 22 by the nuts 21 to urge the cone plate 23 inwardly into engagement with the flywheel 10, whereupon the cone clutch driven member 23, the flywheel 10, the abutment plate 18 and the ball bearing 15 rotate as a unit about the shaft 13 as an axis, and are concentrically arranged with respect thereto.

When the clutch actuating member 35 is moved inwardly into the position shown in Figure 2, the camming surface 34 engages the surface 33 of one arm of the bell crank 29 and raises this arm, tending to force the arm 30 against the boss 56 formed at the inner defining edge of the member 23, and thus cams the plate 23 outwardly against the springs 24, to disengage the clutch.

In practice, it is ordinarily impossible to align the shaft 37 exactly coaxially with the shaft 13, and consequently some misalignment between the axes of the two shafts occurs. This results in producing stresses between the driven clutch member 23 and the spider 38 which transmits the torque to the shaft 37. If the shafts are perfectly aligned there is only the metal-to-metal contact between the bronze bushings 48 and the inner defining surface of the sockets 49 of the arms of the spider 38, and the torque is transmitted therethrough. The bushing 48 has metal-to-metal sliding engagement within the socket 49 for transmitting axial thrusts only, but immediately upon application of any angular torque upon the bushings they become stationary with respect to the spider, and further stresses are taken up within the body of the plastic bushings 47.

Thus, during normal endwise movement of the cone for the purpose of disengaging or adjusting the same, the bushings slide in the spider, but upon the imposition of torque during rotation of the cone 23 with the flywheel 10, and as a result of any slight misalignment, which is inevitable with installations of this sort, the drive is transmitted through the plastic bushings 47, which accommodate or take up any stresses due to the uneven torque produced by such misalignment. Thus, the engaging surfaces of the clutch are not displaced relative to each other and a uniform contact between these surfaces is maintained at all times, and in spite of misalignment between the driving and driven shafts. Due to the fact that any sliding engagement of the cone 23 axially with respect to the driven shaft 37 is taken up by the sliding of the bushings 48 in the openings 49 of the spider, and due to the fact that when the clutch is engaged the pilot bearing takes up any load, at which time both the inner and outer races thereof are stationary with respect to each other, there is never, at any time, any end thrust upon the driving or driven members, whether the clutch is engaged or disengaged.

This construction thus provides for a uniform engagement of the cone plate 23 with the flywheel conical driving surface 26, so that upon engagement of the clutch these surfaces provide an integral driving medium which, through the studs 42, transmits the drive to the spider 38 and thence to the shaft 37. However, there is no mechanical connection between the plate 23 and the spider 38, and therefore any misalignment in the axes of the shafts 13 and 37, which ordinarily would produce metal-to-metal stresses tending to flex either the shafts or the cone structure, will be taken up by the plastic intermolecular yielding of the bushings 47, the cone driven member and the driven shaft being thus separated, mechanically, by yielding bushings.

Figure 3:
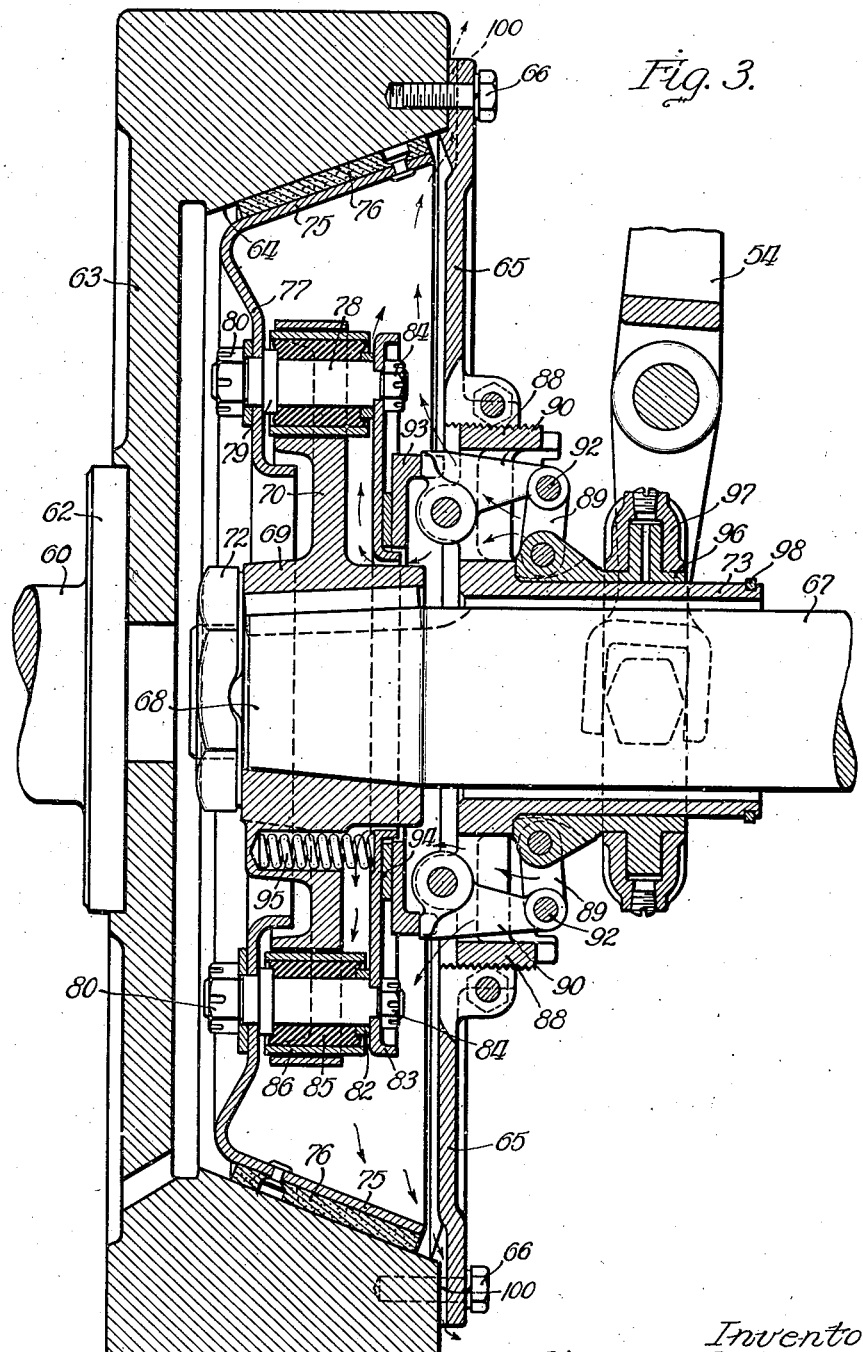
Figure 3 is a vertical sectional view of a modified form of clutch structure embodying the present invention.

Referring now to Figure 3, I have provided a similar construction for use in connection with toggle-operated clutches.

In this embodiment the drive shaft or crank shaft of the engine is indicated at 60, and is provided with a flange portion 62 bolted to the flywheel 63, which flywheel is provided with a clutch engaging surface 64, and with a disc-like closure plate and barrier member 65, bolted, at its periphery, by means of bolts 66 to the flywheel, and rotatable therewith.

The driven shaft is indicated at 67 and is provided with a tapered portion at its inner end, indicated at 68, upon which is mounted the hub 69 of a spider 70, the hub 69 being keyed to the shaft 67 for conjoint rotation therewith. A lock nut 72 secures the spider 70 in position upon the shaft 67.

A cone clutch plate is indicated at 75, having the friction engaging surface 76 which is adapted to engage the surface 64 of the flywheel 63, and provided with a radially inwardly extending portion 77 which extends downwardly and about the hub 69 of the spider 70. The portion 77 of the plate 75 is adapted to carry shouldered stud members 78, which are provided with a shoulder 79 bearing against the outer surface of the portion 77 and held in firm engagement therewith by means of the lock nut 80 secured at its outer end and bearing against the inner surface of the portion 77.

The shank portion of the stud 78 extends through a suitable opening formed in the spider 70 and at its opposite end is provided with a shoulder portion 82 adapted to receive the inner surface of an abutment plate 83, which plate 83 is secured in position by lock nuts 84 threaded onto the opposite ends of the studs 78. Extending about the shanks of each of the studs 78, there being a plurality of these studs disposed circumferentially about the plate 83, is a plastic, yielding bushing 85, corresponding to the bushing 47 of the embodiment shown in Figures 1 and 2, which is compressed between the shoulder 79 and the shoulder 82, and which is adapted to be enclosed within a metallic bushing member 86, such as the bronze bushing 48 of the embodiment of Figures 1 and 2, which bushing members have relative sliding engagement in the openings formed in the spider 70.

The operating means for the clutch structure comprises the hub 73, which is threaded, as shown at 88, into the plate 65 for the purpose of adjustment and to take up wear as the lining 76 of the cone clutch member wears away, and conventional clutch operating toggles 89 and pressure levers 90, conjointly pivoted at 92, are provided, the members 90 having engagement in the floating ring 93 and, through thrust washer 94, to the abutment plate 83. Thus, upon actuation of the toggle links 89, pressure is transmitted through the arms 90 to the floating ring 93 and from the ring through the washer 94 to the abutment plate 83. From the abutment plate 83, axial pressure is transmitted through the studs 78 to the plate portion 77 of the clutch member 75, to engage the clutch member with the surface 64. If the shafts 60 and 67 are in alignment the bronze bushings 86 will have relative sliding engagement with respect to the spider 70, to provide for engagement and disengagement of the clutch.

It will be noted that the bore of the hub 73 is considerably larger than the external diameter of the shaft 67, to accommodate considerable misalignment of this shaft with respect to the driving shaft 60. This design is particularly adaptable to larger sized clutches, such as provided for in heavy duty air compressors, oil well machinery, and similar equipment.

The spider 70, in place of a three-arm spider such as shown in the embodiment of Figures 1 and 2, is in the form of a continuous disc with a plurality of bosses for receiving from eight to twelve plastic bushings. Preferably, a plurality of spring members, indicated at 95, are biased within suitable recesses formed in the spider 70, and bear against the inner surface of the plate 83 for urging the same outwardly to release the clutch and to maintain a relatively light engagement between the thrust washer 94 and the floating ring 93. The slidable actuating member 96, mounted upon the hub 73, is actuated in a suitable manner by a clutch actuating yoke 97, and is limited in its outer movement by means of the annular ring member 98, which limits the throw of the clutch actuating member 96.

Inasmuch as the plate 65 substantially encloses the clutch operating mechanism it is desirable to provide some means for ventilating the same. This is accomplished, in the present invention, by means of a plurality of cut-away openings upon each side of the bolt boss portions which receive the bolts 66 at the outer periphery of the plate 65, these openings being indicated by the numeral 100. There are a plurality of these openings adjacent each of the bolts 66 and, due to the rotation of the plate 65, and consequent rotation of the toggle links 89 and 90, a fanning action is produced which draws air inwardly through the openings in which the links 89 and 90 are pivoted, into the interior of the clutch structure and past the floating ring 93, as shown by the arrows in Figure 3. This air is sucked outwardly through the openings 100 and serves to cool, to some extent, the interior of the clutch structure.

At the same time, as is well known, a considerable mass of small particles, caused by the wearing away of the lining 76 upon the surface 64, accumulates within this enclosure. The openings 100 are large enough to allow for exhausting of these particles through these openings with the air stream, in order to maintain the interior of the clutch housing as clean as possible. It is desirable to remove these particles, since they have a tendency to "wad up" or conglomerate into masses which prevent efficient operation of the clutch.

It will be noted, in connection with this embodiment, that the drive shaft 60, the flywheel 63, and the cone clutch member 75 rotate as a unit about an axis coaxial with the axis of the shaft 60. The drive from the cone clutch member 75 to the spider 70 for the driven shaft 67 is transmitted through the stress absorbing bushings 85 whenever the shafts 60 and 67 are misaligned, the molecular shifting of the bushings 85 under these stresses accommodating this misalignment without producing any flexing of the shafts or of the cone clutch structure. Axial thrusts, for engagement and disengagement of the clutch, are accommodated by sliding movement between the bushings 86 and the sockets formed in the spider 70. The springs 95 serve to retract the clutch from engaged position by imposing an axial outward stress upon the studs 78 when the toggle operating levers are released, which tends to draw the studs 78, together with the bushings 86, outwardly with respect to the spider 70, to move the cone clutch plate 75 outwardly with respect to the flywheel 63. This is accommodated by metal-to-metal sliding engagement of the bushings 86 with respect to the spider sockets.

It is therefore apparent that I have provided a clutch structure in which the cone driven clutch member is coupled, as an integral unit, to the flywheel and rotates as a unit therewith, the transmission of torque from the cone clutch driven member to the driven shaft being through elastic or yielding means which tends to absorb any unequalized stresses therein, caused by misalignment of the shafts.

Having described my invention in accordance with the patent statutes, what I claim as new and desire to secure by Letters Patent is:

1. Coupling means for connecting a driven clutch member to a driven shaft comprising a spider keyed on said shaft, said spider having spaced openings therein, studs on said clutch member extending into said openings, plastic bushings on said studs, means at all times adjustable on said studs for placing said bushings under axial pressure, and metal bushings enclosing said plastic bushings and slidable in said openings.

2. In combination, a flywheel having a clutch surface, a pilot bearing in said flywheel coaxial thereof, an abutment plate having a hub portion engaging in said pilot bearing, a clutch member, a driven shaft, a spider keyed to said driven shaft and having radially extending arms, means carried by said clutch member for supporting said member on said spider, said clutch member being adapted to engage said flywheel clutch surface and to rotate as a unit therewith, and yielding means interposed between said supporting means and said spider for accomodating inaccuracies of alinement between said flywheel and said driven shaft.

3. In combination, a flywheel, a clutch member adapted to have clutching engagement with said flywheel, a driven shaft, a spider keyed thereto, an abutment plate surrounding said shaft, studs carried by said clutch member and extending through openings in said spider to said abutment plate, shoulders on said studs, resilient deformable bushings interposed between said studs and said spider openings and axially compressed between said shoulders, metal sleeves enclosing said bushings and engaging in said openings, and means for imparting axial pressure to said abutment plate, said plate transmitting an axial thrust through said shouldered studs to said clutch member, axial movement of said studs being accommodated by sliding movement of said sleeves in said openings.

4. In a cone friction clutch, a driving member having a conical clutch surface, a shiftable clutch member having a conical clutch surface for cooperation with the conical clutch surface of said driving member and a radially extending portion, a driven shaft, a member connected to turn with said driven shaft and extending radially along one side of the radially extending portion of said shiftable clutch member and provided with openings, studs carried by said clutch member and extending into said openings, resilient bushings disposed in said openings and about said studs for transmitting torque from said clutch member to said driven shaft, spring means for shifting said clutch member in one direction, and means for shifting said clutch member in the opposite direction.

5. In a cone friction clutch, a driving member having a conical clutch surface, a shiftable clutch member having a conical clutch surface for cooperation with the conical clutch surface of said driving member and a radially extending portion, a driven shaft, a member connected to turn with said driven shaft and extending radially along one side of the radially extending portion of said shiftable clutch member and provided with openings, sleeve members shiftably mounted in said openings, studs carried by said clutch member and extending into said sleeve members, and resilient bushings disposed in said shiftable sleeve members and about said studs for transmitting torque from said clutch member to said driven member.

6. In a clutch of the class described, a drive shaft, a flywheel rotatable therewith and having a conical clutch surface, a driven shaft, a cone clutch member adapted to have axial movement into engagement with said conical clutch surface, a spider member keyed to said driven shaft, bushing holders having relatively low coefficients of friction and slidable freely in one of said last two members, and bushings of resilient material mounted in said holders and compressed endwise into binding engagement therewith to be held against movement relative to said holders, said bushings connecting said clutch plate to said spider to transmit torque thereto for driving said driven shaft.

7. In combination, a drive shaft, a flywheel rotatable with said drive shaft and having a clutch surface, a driven shaft coaxial with respect to said drive shaft, a driven clutch member movable axially into and out of engagement with the clutch surface of said flywheel, spring means for moving said driven clutch member into engagement with the clutch surface of the flywheel, a pilot bearing adjacent the axis of the flywheel and coaxial with said driven shaft, an abutment plate having a hub retained against endwise movement in said pilot bearing, a retainer for said pilot bearing, and means externally of said pilot bearing and externally of the endwise retention of the hub of said abutment plate in said pilot bearing for securing the retainer for said pilot bearing to said flywheel.

8. In combination, a shaft, a clutch member shiftable axially of said shaft, a member connected to turn with said shaft, one of said last two members having an opening therein, a stud connected to the other of said members and extending into said opening, a metal sleeve slidably bearing in said opening, and a bushing of resilient deformable material disposed in said sleeve and about said stud for transmitting torque from said clutch member to said shaft, said bushing being held against endwise movement on the stud and compressed axially into binding engagement with the sleeve whereby said bushing, sleeve and stud are shiftable as a unit axially with respect to said opening and on the slidable bearing of said sleeve in said opening when said clutch member is shifted axially.

9. In combination, a first member, a second member, one of said members having an opening therein, a stud connected to the other member and extending into said opening, a metal sleeve bearing in said opening, a bushing of resilient deformable material disposed in said sleeve and surrounding said stud for transmitting torque from one of said members to the other member, said bushing being held endwise upon the stud and pressed into binding engagement with the sleeve whereby the bushing, stud and sleeve are shiftable as a unit in said opening and upon the slidable bearing of said sleeve in said opening to permit free axial shifting movement of one of said first two members with respect to the other of said members.

10. In combination, a driving member having a clutch surface, a coaxial driven member, a clutch member shiftable into and out of engagement with the clutch surface of said driving member, an abutment plate disposed between the driving member and the shiftable clutch member, bolts having abutments cooperating with said plate, said bolts extending through said shiftable clutch member and having second abutments spaced from said first abutments, loading springs coiled about said bolts and confined endwise between the shiftable clutch member and said second abutments, supports fixed to said abutment plate and extending through said shiftable clutch member, abutment means at the inner periphery of the shiftable clutch member, bell crank levers pivoted upon said supports and having generally radially extending arms coacting with said last abutment means and generally axially extending arms, and means shiftable axially along the driven member for camming the generally axially extending arms of said bell crank levers generally radially to disengage the clutch by the coaction of the radially extending arms of said levers with the abutment means at the inner periphery of the shiftable clutch member.

11. In combination, a driving member having a clutch surface, a coaxial driven member, a pilot bearing mounted at the axis of said driven member, a clutch member shiftable into and out of engagement with the clutch surface of said driving member, an abutment plate interposed between the driving member and the shiftable clutch member and held against endwise movement in said pilot bearing, bolts having abutments cooperating with said plate, said bolts extending through said shiftable clutch member and having second abutments spaced from said first abutments, loading springs coiled about said bolts and confined endwise between the shiftable clutch member and said second abutments, supports fixed to said abutment plate and extending through said shiftable clutch member, abutment means at the inner periphery of the shiftable clutch member, bell crank levers pivoted upon said supports and having generally radially extending arms coacting with said abutment means and generally axially extending arms, and means shiftable axially along the driven member for camming the generally axially extending arms of said bell crank levers generally radially to disengage the clutch by the coaction of the radially extending arms of said levers with the abutment means at the inner periphery of the shiftable clutch member.

12. In combination, a driving member having a clutch surface, a coaxial driven member, a pilot bearing mounted at the axis of said driving member, a clutch member shiftable into and out of engagement with the clutch surface of said driving member, an abutment plate interposed between the driving member and the shiftable clutch member and held against endwise movement in said pilot bearing, bolts having abutments cooperating with said plate, said bolts extending through said shiftable clutch member and having second abutments spaced from said first abutments, loading springs coiled about said bolts and confined endwise between the shiftable clutch member and said second abutments, supports fixed to said abutment plate and extending through said shiftable clutch member, abutment means at the inner periphery of the shiftable clutch member, bell crank levers pivoted upon said supports and having generally radially extending arms coacting with said abutment means and generally axially extending arms, means shiftable axially along the driven member for camming the generally axially extending arms of said bell crank levers generally radially to disengage the clutch by the coaction of the radially extending arms of said levers with the abutment means at the inner periphery of the shiftable clutch member, a spider keyed to the driven member and having openings therein, studs on said shiftable clutch member and extending into said openings, bushings of resilient material on said studs, and metal sleeves enclosing said bushings and slidable in said openings.

13. In combination, a shaft, a clutch member shiftable axially of said shaft, a member connected to turn with said shaft, one of said last two members having an opening therein, a stud connected to the other of said members and extending into said opening, a metal sleeve slidably bearing in said opening, a rubber bushing disposed in said sleeve and about said stud for transmitting torque from said clutch member to said shaft, and means for holding said bushing against axial movement on said stud.

14. In a clutch of the class described, a driven shaft, a spider keyed thereto, a clutch member shiftable axially of said shaft, studs carried by said clutch member, said spider having openings adapted to receive said studs, bushings of deformable resilient material disposed about said studs, and metal sleeves enclosing said bushings and mounted for sliding movement in said opening with axial shiftable movement of said clutch member, said bushings absorbing angular stresses imposed by misalignment of the driven shaft with respect to said clutch member and compressed endwise to bind the sleeves, studs and bushings together for axial movement as a unit in respect to said spider.

15. In combination, a driven shaft, a driven clutch member shiftable axially of said shaft, a member connected to turn with said shaft, a sleeve slidably carried by said last member and shiftable with respect thereto in a direction along the axis of said shaft, a stud carried by said driven clutch member and extending into said sleeve, and a bushing of resilient deformable material disposed in said shiftable sleeve and about said stud for transmitting torque from said driven clutch member to said driven shaft, said bushing being compressed endwise to bind the sleeve, stud and bushing together for axial movement as a unit in respect to the member connected to turn with said driven shaft.

16. In combination, a pair of coaxial members one shiftable axially with respect to the other, one of said members having an opening therein, a stud connected to the other of said members and extending into said opening, a sleeve slidably bearing in said opening, a resilient bushing disposed in said sleeve and about said stud for transmitting torque from one of said members to the other member, and means for compressing said bushing endwise so as to hold said bushing, sleeve, and stud against relative movement, the slidable bearing of said sleeve in said opening allowing relative axial movement between one of said members and said bushing, sleeve, and stud as a unit.

17. In combination, a pair of coaxial members one shiftable axially with respect to the other, one of said members having an opening therein, a stud connected to the other of said members and extending into said opening, a sleeve slidably bearing in said opening, and a bushing of resilient material disposed in said sleeve and about said stud for transmitting torque from one of said members to the other member, said bushing absorbing stresses imposed by misalignment and compressed endwise to bind the sleeve, stud, and bushing together against relative movement.

18. In combination, a pair of coaxial members axially spaced and one shiftable axially with respect to the other, one of said members having an opening therein, a stud connected to the other of said members and extending into said opening, a sleeve movably mounted in said opening and a resilient bushing disposed in said sleeve and about said stud for transmitting torque from one of the members to the other member, and means on said stud for holding said bushing against movement relative thereto and allowing relative axial movement between one of said members and said bushing and sleeve.

19. In combination, a driving member having a clutch surface, a coaxial driven member, a clutch member shiftable into and out of engagement with the clutch surface of said driving member, a plate member rotatable with the shiftable clutch member, loading spring means acting against said plate member and said shiftable clutch member for urging the latter toward said clutch surface, supports fixed to said plate member and extending through said shiftable clutch member, abutment means at the inner periphery of the shiftable clutch member, bell crank levers pivoted upon said supports and having generally radially extending arms coacting with said last abutment means and generally axially extending arms, and means shiftable axially along the driven member for camming the generally axially extending arms of said bell crank levers generally radially to disengage the clutch against the action of said loading spring means by the coaction of the radially extending arms of said levers with the abutment means at the inner periphery of the shiftable clutch member.

CLARENCE M. EASON.